(No Model.)
L. W. LOOMIS.
DRIVE CHAIN.
No. 515,004. Patented Feb. 20, 1894.
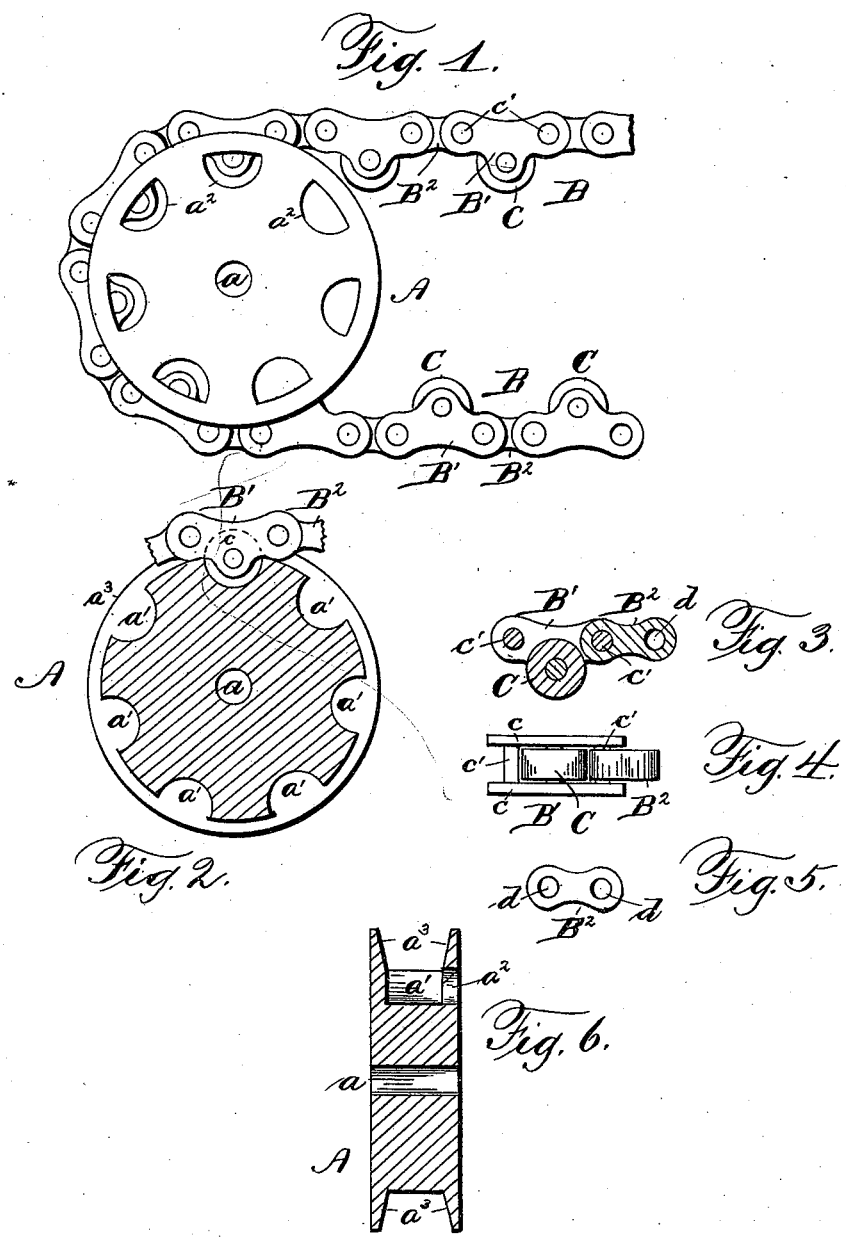
Witnesses
Wm. E. Coulter.
H. W. Fadler.
Inventor:
Leverett W. Loomis,
By H. B. Willson
Atty

UNITED STATES PATENT OFFICE.

LEVERETT W. LOOMIS, OF CARROLLTON, ILLINOIS.

DRIVE-CHAIN.

SPECIFICATION forming part of Letters Patent No. 515,004, dated February 20, 1894.

Application filed May 19, 1893. Serial No. 474,811. (No model.)

*To all whom it may concern:*

Be it known that I, LEVERETT W. LOOMIS, a citizen of the United States, residing at Carrollton, in the county of Greene and State of Illinois, have invented certain new and useful Improvements in Drive-Chains; and I do hereby declare the following to be a full, clear, and exact description of the invention, such as will enable others skilled in the art to which it appertains to make and use the same.

My invention has relation to drive chains, and among the objects in view is to provide a drive chain for use on various classes of machinery, and more especially for use on bicycles, tricycles and the like, which shall be of simple and inexpensive construction, efficient in operation, and which shall at the same time be very strong and durable.

My invention consists in the novel construction, arrangement and combination of parts, all as hereinafter fully described, illustrated in the accompanying drawings, and pointed out in the appended claim.

In the drawings:—Figure 1 is a side view of my improved drive chain and pulley. Fig. 2 is a vertical section of the pulley, showing one of the links of the chain engaging the same. Fig. 3 is a vertical section of the links constituting my improved chain. Fig. 4 is a plan view thereof. Fig. 5 is a detail view of one of the links. Fig. 6 is a vertical section of a slightly modified form of pulley.

In carrying out my invention I provide a pulley or wheel A, which is adapted for use in connection with my drive chain presently described, said pulley or wheel being provided with a central bearing-opening $a$, to adapt it to be mounted upon a suitable shaft. Said pulley A is provided with the annular side flanges $a^3$ which project slightly beyond the inner body-portion of the pulley, and between which flanges the drive chain is adapted to pass. The body-portion of the pulley is provided with the circumferentially-arranged semi-cylindrical recesses or depressions $a'$, which are positioned at certain distances apart for a purpose presently explained.

B indicates my improved drive-chain, which is composed of a series of links $B'$, $B^2$, pivotally connected together. Each link $B'$ embodies the side pieces or cheeks $c$, $c$, connected together by the transverse bearing-pins or studs $c'$.

Upon the center pin or stud $c'$ and between the cheeks $c$ is pivotally mounted an anti-friction roller C, which is of a diameter to project beyond the said cheeks and seat snugly within the bearing recesses or depressions $a'$ of the pulley, in the manner shown in Figs. 1 and 2.

The links $B^2$ constitute the intermediate connecting-links for the links $B'$, and each of said links $B^2$ is provided with openings $d$, $d$, through which pass the studs or pins $c'$ of the adjacent links $B'$ whereby the latter and the links $B^2$ are pivotally connected together. The number of the bearing recesses or depressions $a'$ in the pulley will of course vary and will depend upon the size thereof, but in all cases the distance that said depressions are apart should correspond with the distance between the anti-friction rollers, so that the latter may properly engage the depressions when passing around the pulley.

It will be seen that by providing the anti-friction rollers the friction between the links and pulley as well as the wear upon the latter will be reduced to a minimum, and thus the parts will be enabled to maintain a close fit and lost motion between them avoided.

Owing to the arrangement and construction of the parts the intermediate links $B^2$ will not come in contact with the circumferential face of the pulley when the chain is passing around the same, and thus friction and consequent wear between said links and the face of the pulley is prevented.

In order to prevent the chain from slipping off the pulley when in operation, I may extend the side flanges $a^3$ some distance beyond the circumferential face of the pulley as shown in Fig. 6 which flanges will thus act as guards for the chain.

I provide the pulley A upon one side with a series of openings $a^2$ which correspond in number and position with the bearing depressions $a'$ and communicating with the same, whereby particles of dirt or lubricant that may accumulate within said depressions may be readily removed.

The advantages of my invention will be readily appreciated from the foregoing description when taken in connection with the accompanying drawings.

What I claim, and desire to secure by Letters Patent, is—

The herein described drive-chain, consisting of the links B' each having side pieces or cheeks $c, c$, pivot-studs $c'$ connecting said cheeks at each end of the same and intermediate the said ends, antifriction rollers C mounted on the intermediate studs $c'$ and projecting beyond one of the lateral edges of the said links B', and links $B^2$ connecting the links B' and pivotally mounted at their ends upon the adjacent pivot-studs of adjoining links B'; said links lying between the cheeks $c$, of the said links B', all arranged as and for the purpose specified.

In testimony whereof I affix my signature in presence of two witnesses.

LEVERETT W. LOOMIS.

Witnesses:
  E. A. DOOLITTLE,
  ARCHIE T. SCRUBY.